United States Patent
Johannesson et al.

(10) Patent No.: US 11,736,816 B2
(45) Date of Patent: Aug. 22, 2023

(54) IMAGE SENSOR CIRCUITRY FOR REDUCING EFFECTS OF LASER SPECKLES

(71) Applicant: SICK IVP AB, Linköping (SE)

(72) Inventors: Mattias Johannesson, Linköping (SE); Johan Melander, Linköping (SE); Romain Müller, Stegen (DE)

(73) Assignee: SICK IVP AB, Linköping (SE)

( * ) Notice: Subject to any disclaimer, the term of this patent is extended or adjusted under 35 U.S.C. 154(b) by 176 days.

(21) Appl. No.: 17/169,104

(22) Filed: Feb. 5, 2021

(65) Prior Publication Data

US 2021/0258452 A1    Aug. 19, 2021

(30) Foreign Application Priority Data

Feb. 19, 2020 (EP) ...................................... 20158365

(51) Int. Cl.
*H04N 13/254* (2018.01)
*H04N 23/81* (2023.01)

(52) U.S. Cl.
CPC ........... *H04N 23/81* (2023.01); *H04N 13/254* (2018.05)

(58) Field of Classification Search
CPC .............................. H04N 5/217; H04N 13/254
See application file for complete search history.

(56) References Cited

U.S. PATENT DOCUMENTS

| | | | |
|---|---|---|---|
| 2003/0169847 A1* | 9/2003 | Karellas | A61B 6/482 378/98.3 |
| 2008/0117425 A1* | 5/2008 | Kain | C12Q 1/6837 356/455 |
| 2011/0112784 A1* | 5/2011 | Nikitin | H03H 11/0405 702/70 |
| 2011/0123130 A1* | 5/2011 | Nojima | G06T 5/003 382/255 |

(Continued)

FOREIGN PATENT DOCUMENTS

JP    10332335 A    12/1998
JP    2003189193 A    7/2003
(Continued)

OTHER PUBLICATIONS

Rakesh "Novel Algorithm of Adaptive Median Filter for Removal of Noises in both Image and Signal Processing" Jun. 2018.*

(Continued)

*Primary Examiner* — James T Boylan
(74) *Attorney, Agent, or Firm* — Renner, Otto, Boisselle & Sklar, LLP

(57) ABSTRACT

Image sensor circuitry comprising an image sensor and method for supporting reduction of laser speckle effects in a digital image. Per each pixel position (x, y) of at least a subregion of the image sensor, the image sensing circuitry: Assigns to said pixel position (x,y) a predefined pixel window (w) comprising said pixel position (x,y) and one or more of its closest neighboring pixel positions. Obtains first pixel values for each pixel located within said predefined (Continued)

pixel window (w), said first pixel values resulting from the same exposure and corresponding to sensed light from this exposure. Combines the obtained first pixel values into a single, second pixel value according to a predefined combination function. The digital image is provided based on the second pixel values.

9 Claims, 10 Drawing Sheets

(56) References Cited

U.S. PATENT DOCUMENTS

| | | | | |
|---|---|---|---|---|
| 2014/0218567 A1* | 8/2014 | Han | ............... | H04N 5/2355 348/239 |
| 2015/0319379 A1* | 11/2015 | Nussmeier | ............ | G01J 5/22 348/165 |
| 2019/0020865 A1* | 1/2019 | Kang | ............ | H04N 13/239 |
| 2019/0172180 A1* | 6/2019 | Ganesan | ............ | G06T 7/90 |
| 2019/0297295 A1 | 9/2019 | Roberts et al. | | |
| 2020/0249354 A1* | 8/2020 | Yeruhami | ............ | B60S 1/02 |
| 2020/0382730 A1 | 12/2020 | Kurokawa et al. | | |
| 2021/0304396 A1* | 9/2021 | Addington | ............ | G06T 7/0006 |

FOREIGN PATENT DOCUMENTS

| | | |
|---|---|---|
| JP | 2011044887 A | 3/2011 |
| JP | 2014217021 A | 11/2014 |

OTHER PUBLICATIONS

Panesh et al. "Preserving the Edges of a Digital Image using Various Filtering Algorithms and Tools" Dec. 2016.*

Xu, et al., "Charge Domain Interlace Scan Implementation in a CMOS Image Sensor," IEEE Sensors Journal, vol. II, No. II, Nov. 2011, pp. 2621-2627.

Xu, et al., "A CMOS Image Sensor with Charge Domain Interlace Scan," IEEE Sensors 2010 Conference, pp. 123-127.

* cited by examiner

IMAGE SENSOR CIRCUITRY FOR REDUCING EFFECTS OF LASER SPECKLES

TECHNICAL FIELD

Embodiments herein concern an image sensing circuitry comprising an image sensor and how such image sensing circuitry can be configured to support reduction of laser speckle effects in a digital image based on light sensed by the image sensor, and a method for this.

BACKGROUND

A digital image is typically defined as an array of pixels. The number of pixels in the array is usually referred to as the resolution. Each pixel is represented by, i.e. is associated with, one or more pixel values comprising information about the image for the position of the pixel. In a grayscale digital image the pixel value is typically represented by a non-negative integer value describing the intensity of that pixel. The bit-depth of an image define the range of values that a pixel can have.

Industrial vision cameras and systems for factory and logistic automation may be based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by reflection of laser light, such as from a laser-line, which e.g. is the case for so called laser triangulation.

3D machine vision systems are often based on using laser light, for example as used in laser light triangulation. In such a system there may be a light source illuminating the object with a laser line and along which line 3D characteristics of the object can be captured, corresponding to a profile of the object. By scanning the object with such a line, i.e. performing a line scan, 3D characteristics of the whole object can be captured, corresponding to multiple profiles.

3D machine vision systems or devices that use a sheet of light for triangulation may be referred to as systems or devices for 3D imaging based on light, or sheet of light, triangulation, or simply laser triangulation when laser light is used.

Conventionally, to produce a 3D-image based on laser light triangulation, reflected light from an object to be imaged is captured by an image sensor of a camera and intensity peaks are detected in the image data since these occur at positions corresponding to locations on the imaged object with the incident light, e.g. corresponding to a laser line, that was reflected from the object. The position in the image of a detected peak will map to a position on the object from where the light resulting in the peak was reflected. Each peak has both height and width because of how the light is reflected in practice, where the light will always spread and diffuse to some extent when reflected from the object, even in the case of laser light. This means that a peak involves multiple consecutively occurring pixels in the image, e.g. along a certain direction, such as in a column of pixels, in the image. For finding the positions of the peaks in the image, there is typically applied some algorithm that operates on the image data and provides the peak position, such as by finding a position corresponding to the center of the peak, e.g. using center-of-gravity or a similar algorithm. It is realized that the accuracy of such 3D images, and thus also the ability of providing accurate 3D data and images, depend on the ability to be able to identify and find positions of intensity peaks in image data.

When structured laser light, like in 3D imaging applications, is used and imaged to extract information, the coherence of the laser light leads to the formation of so called speckles. These speckles can severely degrade the quality of information. Speckles arise due to the optics involved, a laser beam is passing through and adding up wave front errors or due to scattering from roughness of the surface of an object being imaged.

When pixel size is large, speckle induced distortions in the image are typically of no practical concern, but as resolution increases and pixel size decreases, speckle impact and distortions become a greater problem and may even be a limiting factor. In other words, when pixel size decreases, the impact of laser speckles increases. In 3D imaging based on laser triangulation, speckles may e.g. result in lower accuracy when determining the peak positions and may thus also limit the ability of providing accurate 3D data and images.

There are different solutions for speckle reduction in the prior art, mainly based on introduction of some randomness in the laser light to thereby average out the speckles. For example, there are solutions based on modulating the frequency of the laser. Some uses a cuvette with a liquid and small particles to utilize the effect of Brownian motion of the particles to accomplish a random scattering of light. Others are based on using a rotating object to average out the laser speckles.

US20180203249A1 is based on provision of a coherent light (laser) beam that moves cyclically across e.g. a linear diffuser so that local phase of the line pattern projected through the diffuser change fast and an imaged speckle pattern varies at a high rate, allowing for also relatively short exposure times.

SUMMARY

In view of the above an object is to provide one or more improvements or alternatives to the prior art, such as providing a solution for reducing effects of laser speckles in a digital image, in particular in a digital image resulting from an image sensor sensing laser light reflected from an object as part of laser triangulation performed by a 3D imaging system.

According to a first aspect of embodiments herein, the object is achieved by an image sensor circuitry comprising an image sensor, configured to, per each pixel position of at least a subregion of the image sensor: Assign to said pixel position a predefined pixel window comprising said pixel position and one or more of its closest neighboring pixel positions. Obtain first pixel values for each pixel located within said predefined pixel window, said first pixel values resulting from the same exposure and corresponding to sensed light from this exposure. Combine the obtained first pixel values into a single, second pixel value according to a predefined combination function. Further, the image sensor circuitry may be configured to then provide the second pixel value as the pixel value of the pixel position instead of its first pixel value.

According to a second aspect of embodiments herein, the object is achieved by a method, performed by an image sensor circuitry comprising an image sensor, for supporting reduction of laser speckle effects in a digital image. Per each pixel position of at least a subregion of the image sensor the image sensing circuitry: Assigns to said pixel position a predefined pixel window comprising said pixel position and one or more of its closest neighboring pixel positions. Obtains first pixel values for each pixel located within said predefined pixel window, said first pixel values resulting from the same exposure and corresponding to sensed light from this exposure. Combines the obtained first pixel values into a single, second pixel value according to a predefined combination function. The image sensor circuitry provides the digital image based on the second pixel values.

The image sensor configured to perform as above for all involved pixel positions, e.g. for said at least subregion of the image sensor, enable reduced influence of laser speckles in a digital image based on the second pixel values instead on the first pixel values, such as the digital image provided by the method. At the same time, since there will still be a 1:1 mapping between second and first pixel values, loss of resolution can be avoided. Also, the combination, typically including adding of first pixel values, enables increased signal, which can be utilized to decrease exposure time and save time per exposure to produce first pixel values. This can be utilized so that a digital image with said reduced influence of speckles and based on second pixel values can be provided at approximately the same speed as a conventional digital image comprising first pixel values. The combining of the first pixel values into the second pixel value may be made in parallel for pixel positions with non-overlapping pixel windows and sequentially for pixel positions with overlapping pixel windows. Since each first pixel value thereby is not be involved in multiple combinations into second pixel values at the same time, implementation with image sensors based on destructive readout is facilitated.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
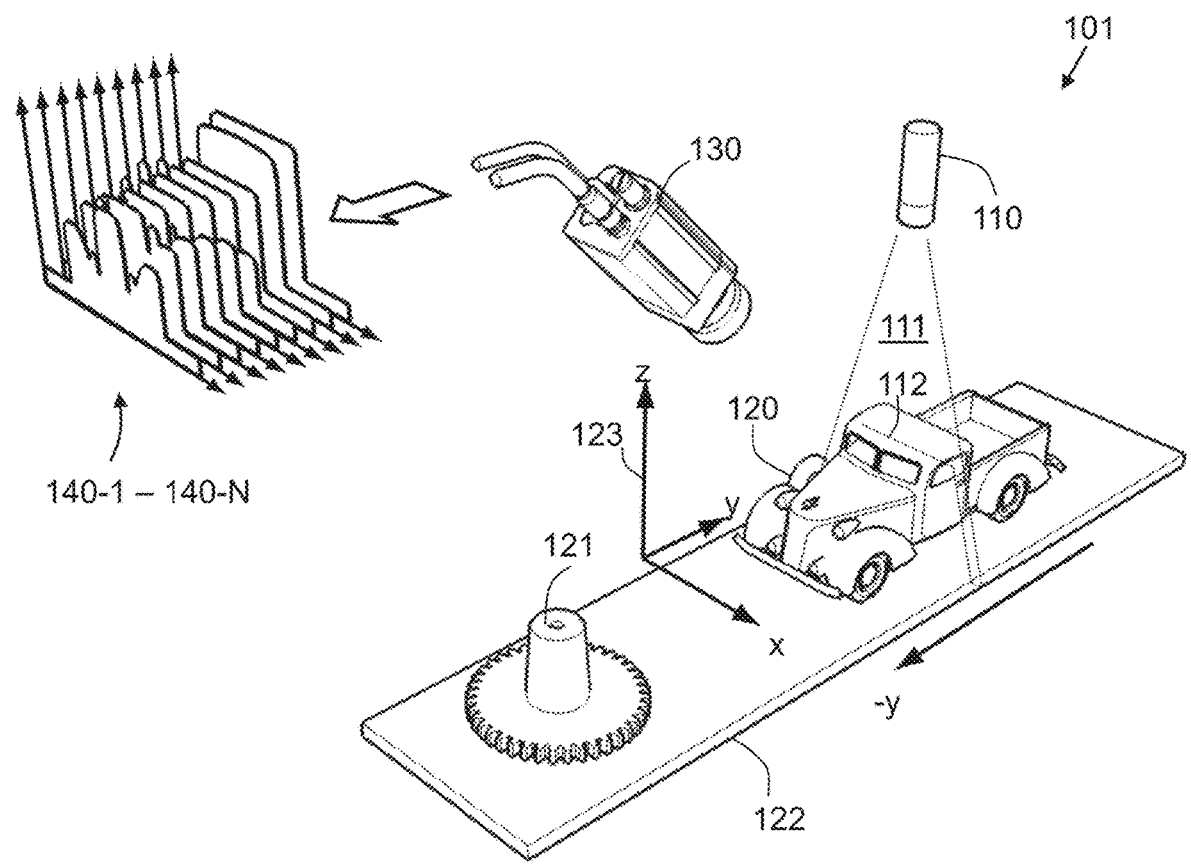
FIG. 1 schematically illustrates a triangulation based 3D imaging system for provision of 3D images and in which systems embodiments herein may be implemented.

FIG. 1 schematically illustrates an example of such type of 3D imaging system as mentioned in the Background, namely a 3D imaging system 100, that thus also is an example of a machine vision system. As will be explained further below the system 100 may be used for implementing embodiments herein.

The system 100 is configured to perform light triangulation, here in the form of sheet of light triangulation as mentioned in the Background, here based on coherent light, such as laser light. The system 100 further comprises a light source 110, i.e. here a coherent light source, such as a laser, for illuminating objects to be imaged with a specific light pattern 111, in the figure exemplified and illustrated as a sheet of light. In the shown example, the objects are exemplified by a first object 120 in the form of a car and a second object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112, typically a laser line, on the first object 120. The specific light pattern 111 is reflected by the object, more specifically by portions of the object at the intersection, i.e. at the light line 112 in the shown example. The measuring system 100 further comprises a camera unit 130 comprising an image sensor (not shown in FIG. 1A), which is arranged in relation to the light source 110 and the objects to be imaged so that the specific light pattern, when reflected by the objects, become incident light on the image sensor. The image sensor is an arrangement, typically implemented as a chip, for converting incident light to image data. The image sensor may e.g. comprise x rows and y columns of pixels, resulting in a total of x*y pixels. In some embodiments herein, as will be explained separately below, the image sensor of the camera unit 130 is comprised in an image sensor circuitry according to embodiments herein. Said portions of the object, which by reflection causes said incident light on the image sensor, may thereby be captured by the camera unit 130 and the image sensor, and corresponding image data may be produced and provided for further use. For example, in the shown example, the specific light pattern 111 will at the light line 112 on a portion of the car roof of the first object 120 be reflected towards the camera unit 130 and image sensor, which thereby may produce and provide image data with information about said portion of the car roof. With knowledge of the geometry of the measuring system 100, e.g. how image sensor coordinates relate to world coordinates, e.g. coordinates of a coordinate system 123, e.g. Cartesian, relevant for the object being imaged and its context, the image data may be converted to information on 3D characteristics, e.g. a 3D shape or profile of the object being imaged in a suitable format. The information on said 3D characteristics, e.g. said 3D shape(s) or profile(s), may comprise data describing 3D characteristics in any suitable format.

By moving e.g. the light source 110 and/or the object to be imaged, such as the first object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profile images 140-1-140-N of the first object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera unit 130 may be moved over the object, so that all portions of the object, or at least all portions facing the light source 110, are illuminated and the camera unit receives light reflected from all parts of the object desirable to image.

In general reflected light can be diffuse and/or specular. As realized, objects as above are causing diffuse reflections and imaging system of main interest here are normally designed for imaging of such objects, i.e. with surfaces that scatter light and not objects with a mirror like surface that cause specular reflection.

As understood from the above, an image provided by the camera unit 130 and the image sensor, e.g. of the first object 120, may correspond to any one of the profile images 140-1-140-N. Each position of the contour of the first object shown in any of the profile images 140-1-140-N are determined based on identification of intensity peaks in image data captured by the image sensor and on finding the positions of these intensity peaks. When laser speckles are present, the result is that the peak positions in the profile images become more difficult or impossible to find, at least with a desirable accuracy.

Figure 2:
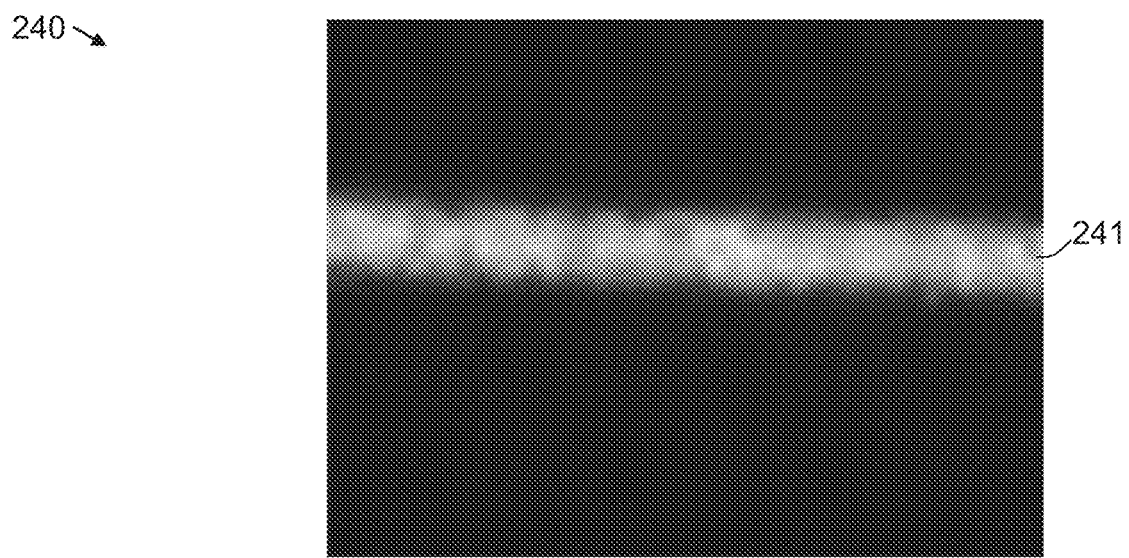
FIG. 2 shows an example of a digital image capturing a light line resulting from reflection of a laser line on an object.

When the image sensor of the camera unit 130 is comprised in an image sensor circuitry according to embodiments herein, such effects of laser speckles can be reduced and peaks can be determined with greater accuracy than else would be possible. As a result, also more accurate 3D images can be provided, and especially at high resolutions. 3D imaging of small object may particularly benefit from this FIG. 2 shows an example of a digital image 240 capturing a light line 241 resulting from diffuse reflection of laser line on an object, the light line comprising a speckle pattern superimposed onto a laser line structure. An inhomogeneous intensity pattern can be observed. Presence of laser speckles is here a reason behind the inhomogeneous intensity pattern. The inhomogeneous intensity pattern is caused by phase differences of the wave front of the scattered light resulting from the diffuse reflection. Due to this it can be cumbersome to detect the actual peak position with desirable accuracy. The laser line 241 may e.g. correspond to part of a line of a profile image, such as any one of the profile images 140-1-140-N, without any reduction of speckle effects.

An advantage with the prior art solutions mentioned in the Background is that the averaging to reduce the speckle effects is done on a single pixel level. However, a disadvantage is that mechanical, typically rotating, parts have to be introduced, which are relatively costly and can also lead to a shorter product lifetime and in some cases are unsuitable to apply in an industrial context. Moreover, mechanically based solutions are often inherently too slow for many high speed applications, as often is the case when laser triangulation is applied. It would e.g. be desirable with a solution that is less speed limiting, can be implemented more cost efficiently and without introducing new kind of parts that may cause new type of problems and/or negatively affect operative uptime and/or product lifetime.

Briefly and simply described, embodiments herein are based on the idea of reducing the speckle effects after the image sensor has sensed the light. This is done by operating on the pixel values resulting from exposure of the image sensor. It can and is preferably done in close connection with reading out the pixel values on the analogue side, i.e. before analogue to digital conversion. An image sensing circuitry comprising the image sensor may be configured to carry out certain steps, explained in detail below, that may briefly be described as application of rolling binning with preservation of resolution. Existing image sensing circuitry comprising, and for operating, an image sensor can comparatively simply be modified and configured to implement embodiments herein.

As used herein and in the following, the term "pixel value" may refer to any kind of information or measure representing or corresponding to sensed light in a pixel of an image sensor, e.g. an amount of charge resulting from exposure of the pixel or a voltage corresponding to the amount of charge and/or sensed light.

FIGS. 3A-E will be used to exemplify the principle underlying embodiments herein for accomplishing a reduction of undesirable laser speckle effects as discussed above.

Figure 3A:
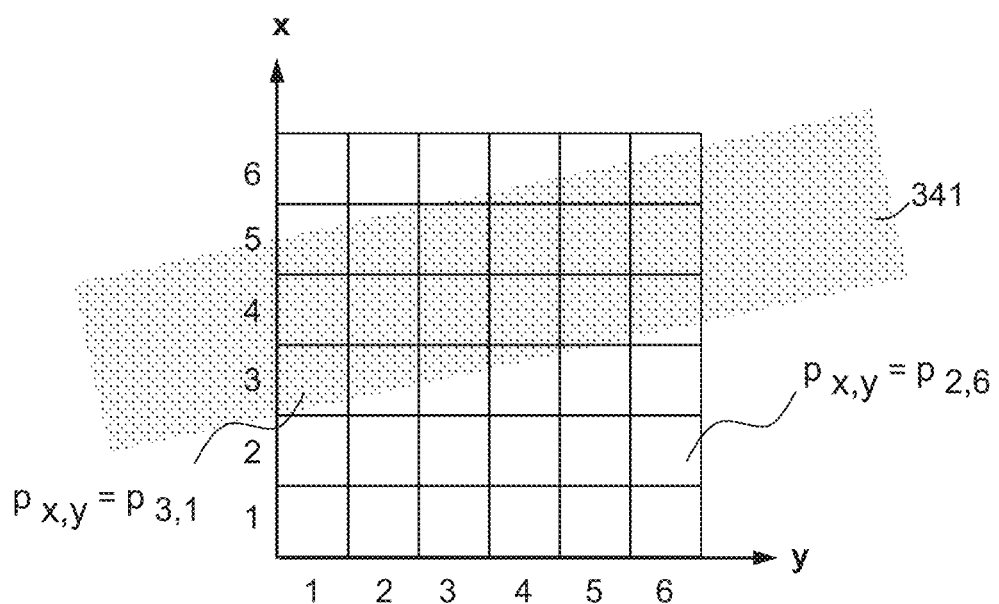
FIGS. 3A-E are various schematic views for exemplifying a principle underlying embodiments herein for accomplishing a reduction of undesirable laser speckle effects.

FIG. 3A schematically illustrates an image sensor area with x rows and y columns of pixels and how the pixels may have been exposed and sensed to light comprising a light line 341, whereby the pixels thereafter holds a respective pixel value corresponding to sensed light from the exposure of that pixel. In this situation the pixel value is typically represented by stored charges in the image sensor pixel. To exemplify the principle of pixel naming by position, two pixels are specifically indicated, a pixel $p_{3,1}$. i.e. at row 3, column 1, which as shown in the figure holds a pixel value resulting from captured light from the light line 341, and a pixel $p_{2,6}$, i.e. at row 2, column 6, that holds a pixel value outside the light line 341 and that may correspond to no, or significantly less, sensed light.

Figure 3B:
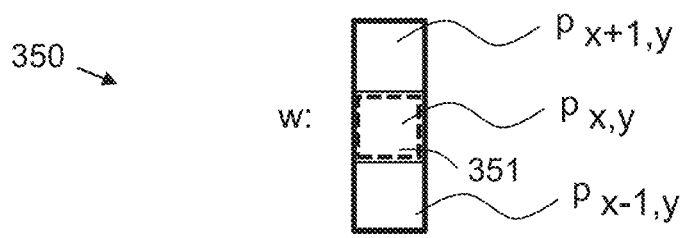

FIG. 3B schematically shows an example of a pixel window 350, herein the form of 3×1 pixel window, i.e. comprising 3 consecutive pixels located along a line. With reference to FIG. 3A, for example 3 consecutive pixels along a column. Pixel windows are generically indicated by win in the following and in the figures. A pixel window, as used herein, is a virtual window and may be defined by any information determining or specifying how a number of directly neighboring pixels shall be grouped, and thus corresponds to a specific grouping, such as according to a certain pattern, of pixels. For example a pixel window may be defined or determined by information on a number of pixels and how they relate to each other, e.g. how they are positioned in relation to each other. Each pixel window herein should correspond to a continuous group of pixel positions.

Further, each pixel window herein may be specifically associated with one particular pixel position of the window, which pixel position may be referred to as the target pixel position of the pixel window and relates to how the pixel window is used in the context of embodiment herein, as will be explained next. Pixel window may be considered an expression for explaining function and underlying principles of embodiments herein. The pixel window 350 has a target pixel position 351.

The idea underlying embodiments herein is to replace pixel values directly resulting from exposure of the image sensor, referred to as first pixel values in the following, with second pixel values. The second pixel value for a pixel position being based on the first pixel value of that position combined with first pixel values of neighboring pixel positions so that a digital image based on second pixel values instead of the first values can be less influenced by speckle effects. The pixel window determines which pixel positions to be involved in the combination. For example, with the target pixel position positioned at a certain pixel position with a first pixel value, the pixel window determines which other pixels shall be involved in the combining that results in the second value for said certain the pixel position. This should be done for all pixels of the image sensor, or at least for a subregion of pixels where speckle reduction is desirable, such as all pixels where the exposure has resulted in a significant change of pixel values resulting from sensed light, and/or where pixels values that suffer from speckle effect may be expected.

Figure 3C:
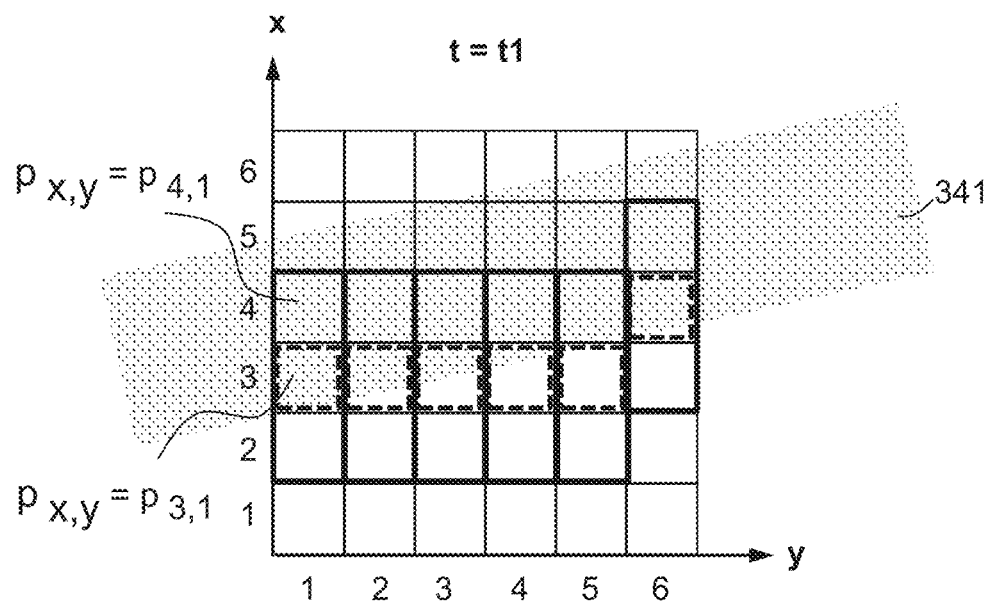

FIG. 3C schematically shows pixels windows, each corresponding to the pixel window 350, now in the context of FIG. 3A, with one pixel window shown in each column. The pixel windows are in the example positioned so that the target position of each pixel window is positioned where the pixels hold pixels values that have significantly changed due to exposure of the light line 341. For example, there is shown a pixel window with target position placed on pixel $p_{x,y}=p_{3,1}$ and to provide a new, second pixel value for this pixel, the first pixel values of pixels covered by the window are to be combined, i.e. the pixels $p_{2,1}$, $p_{3,1}$, $p_{4,1}$. The combination should be done according to a predefined or predetermined combination function, discussed and explained in further detail below, which simply may correspond to or comprise an averaging of the first pixel values.

Since second pixel values are to be provided for every pixel of a subregion, e.g. for all pixels in column y=1, or at least for all pixels in that column that have sensed light from the light line 341, such as pixels $p_{3,1}$, $p_{4,1}$, $p_{5,1}$, there is a needed overlap between pixel windows. This is not shown in the figure since it would be very messy with a pixel window 350 at every pixel. It is realized that that the number of pixels covered by a window will determine the number of times the first pixel value of a pixel may be needed for providing second pixel values. In the shown example, since the pixel window cover 3 pixels, the first pixel value of a pixel may be needed 3 times for providing second pixel values. For example, the first pixel value of pixel $p_{4,1}$ is used for providing the second pixel value of pixel $p_{3,1}$, as indicated in the figure by the pixel window with target position at $p_{3,1}$ covers also pixel $p_{4,1}$, but it will also be used for providing the second pixel value for itself, i.e. for pixel $p_{4,1}$, as well as for pixel $p_{5,1}$, since the pixel window 350 with target position 351 at pixel $p_{5,1}$ will cover also pixel $p_{4,1}$.

A fact that may complicate such need for "multi-use" of the same first pixel value of each pixel, i.e. of the pixel values resulting from sensed light during exposure, is that readout of pixel values from pixels is typically destructive. That is, a pixel senses light during exposure and when the pixel value, corresponding to charges, is read out, the pixel thereafter no longer holds the pixel value, typically because the charges have been transferred away by the readout. One solution may be to store read out first pixel values in some memory that can be read non-destructively, however, that may be an expensive solution, may introduce delays and may be difficult to implement in close connection with the pixels. A solution that instead may be preferred and has some special advantage when used in connection with combining of pixel values, is to make sure that combinations of first pixel values are only made for non-overlapping pixel windows at the same time, i.e. in parallel, whereby each first pixel value will only be used in one combination at a time to provide a second pixel value. Then there is a new exposure, new first pixel values are formed, the non-overlapping pixel windows are moved by one pixel position i.e. so that the target pixel position of each is moved one pixel, and there is a new readout etc. In the shown example with the 3 pixel window, it is thus required 3 exposures and three movements of pixel windows to be able to provide second pixel values for all pixels. After each exposure there is a combination of 3 first pixel values for providing a second pixel value for the pixels at the target pixel positions of the non-overlapping pixel windows. It may seem as 3 exposures will introduce a delay with a factor 3 compared to a single nominal exposure, however, each exposure may in this context be at approximately ⅓ of the nominal exposure time and hence actual delay can be avoided, or at least any delay introduced can be so small that it is not a practical problem. A third of a nominal exposure time may be sufficient due to the combination of three first pixel values into one second pixel value, which enables 3 time as strong signal, e.g. 3 times more charge. In fact, the weaker first pixel values may even assist in implementation of a combination function that averages first pixel values since an addition of three ⅓ first pixel values corresponds to adding three first pixel values and dividing by 3, i.e. a second pixel value corresponding to an average can be accomplished simply by adding first pixel values.

Figure 3D:
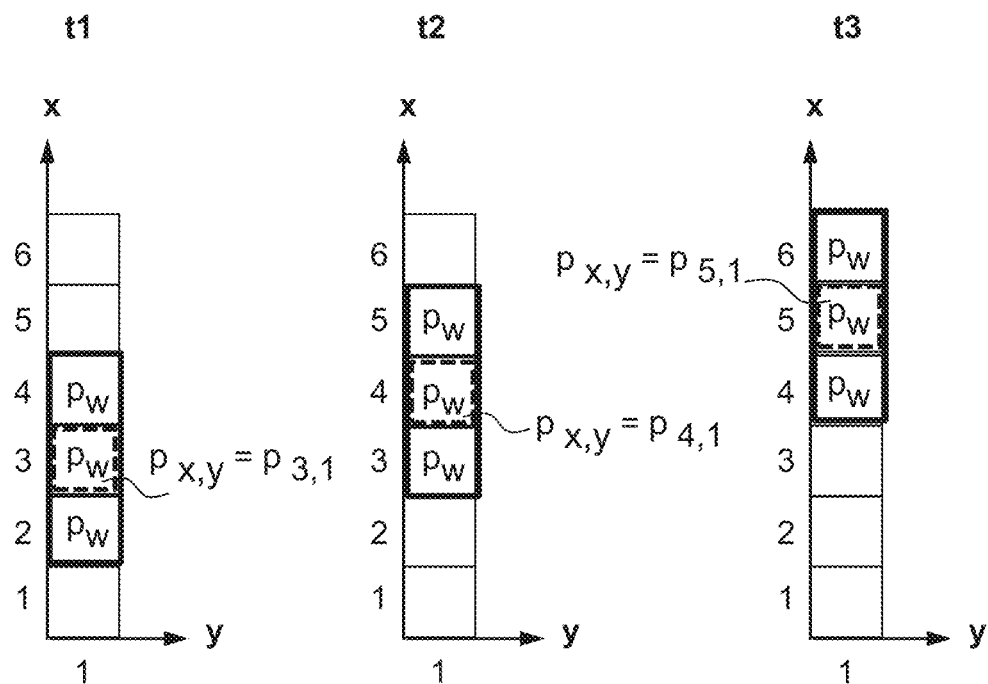
Figure 3E:
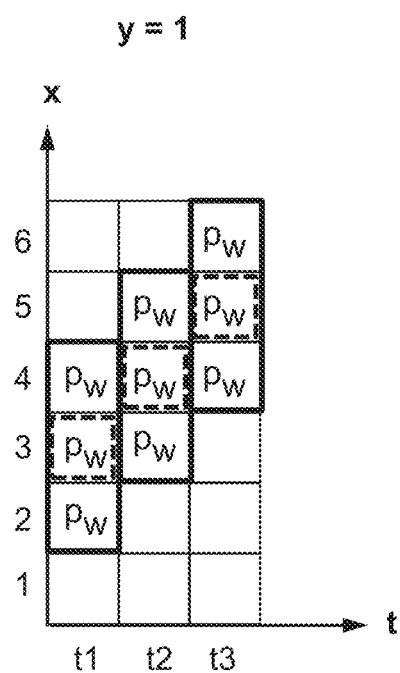

FIGS. 3D-3E schematically exemplifies the above, i.e. avoidance of overlapping pixel windows and thereby avoidance of the need to use the same first pixel value in multiple combinations. FIG. 3D shows pixels and pixel window for the column y=1 in FIG. 3C, and FIG. 3E is another view of basically the same thing, but with time along the horizontal axis. There are three different time instants t1-t3. Pixels within each shown pixel window is in the figured marked $p_w$. After a first exposure, e.g. at ⅓ of a nominal exposure time, there is at time instant t1 a pixel window with target pixel position at pixel $p_{3,1}$ for provision of a second pixel value for pixel $p_{3,1}$. At the same time, although not shown in the figure, there may be other pixel windows applied but not overlapping with the shown pixel window. For example, there may be a pixel window covering pixels $p_{5,1}$ $p_{6,1}$ and $p_{7,1}$ at the same time and first pixel values of these pixels being combined to provide a second pixel value for pixel $p_{6,1}$. Then at time instant t2, after a second exposure also at e.g. ⅓ of the nominal exposure time, there is a pixel window at pixel $p_{4,1}$ for provision of a second pixel value for pixel $p_{4,1}$, which may be seen as the pixel window has moved by one pixel between t1 and t2. Or in general, at time t2, non-overlapping pixel windows at t1 has moved one pixel position and are still non-overlapping. Thereafter, at time instant t3, this is repeated again, that is, after a third exposure, also at e.g. ⅓ of the nominal exposure time, the pixel window is at pixel $p_{5,1}$ for provision of a second pixel value for pixel $p_{5,1}$.

Figure 4:
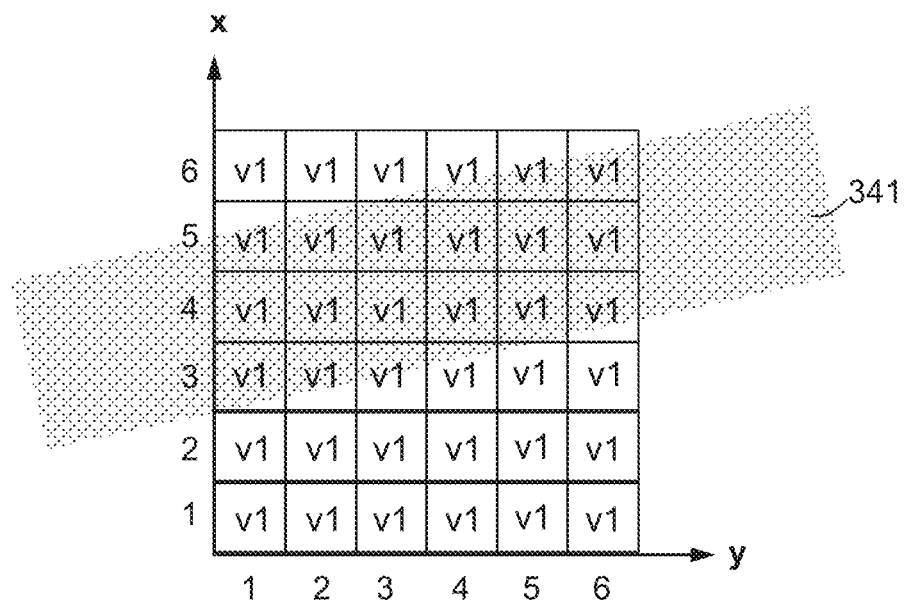
FIG. 4 schematically exemplifies what the result may be after application of embodiments herein as described above for FIGS. 3A-E
Figure 4:
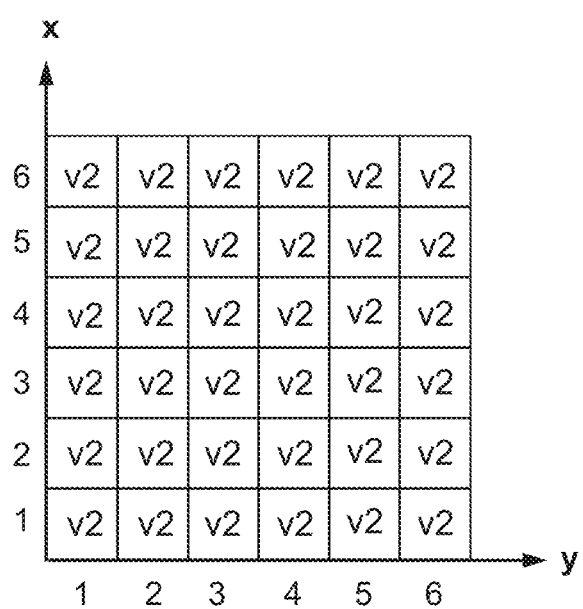

FIG. 4 schematically exemplifies what the result may be after application of embodiments herein as described above for FIGS. 3A-E, i.e. with application of pixel window and combination of first pixel values v1 into second pixel values v2 as described above. The second pixel values v2 may thus be considered replacing the first pixel values. Here second pixel values have been provided for all pixels of the image sensor. However, it could alternatively been provided second pixel values only for pixels that were substantially affected by light, e.g. by the light line 341 during exposure.

Figure 5:
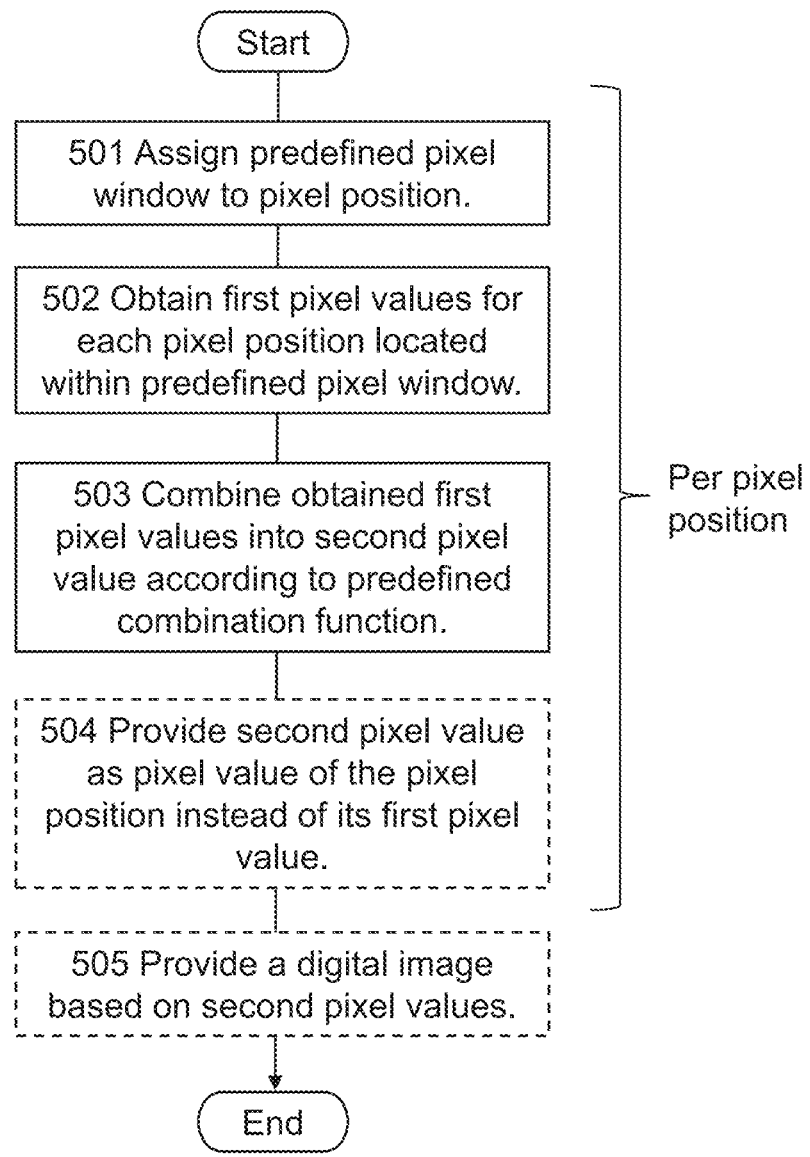
FIG. 5 is a flowchart schematically illustrating embodiments of a method according to embodiments herein.

FIG. 5 is a flowchart schematically illustrating embodiments of a method according to embodiments herein. The actions below, which may form the method, may thus be for supporting provision of a digital image based on second pixel values as discussed above, instead of first pixel values, and thereby enable reduced influence of laser speckles in the digital image. In other words the method is for supporting reduction of laser speckle effects in a digital image.

The method and/or actions should be performed by an image sensing circuitry comprising an image sensor. The image sensing circuitry is further discussed separately below.

Note that the actions below in general may be taken in any suitable order and/or be carried out fully or partly overlapping in time when this is possible and suitable.

The following actions 501-504 are performed per each pixel position, e.g. x,y, of at least a subregion of an image sensor, i.e. such image sensor as discussed above and that is used for providing the digital image and part of the image sensing circuitry performing the method and/or actions. In other words, the actions are performed for each pixel position of the image sensor or for a subregion thereof where speckle reduction is desirable, as discussed above.

Said "per each pixel position of at least a subregion of the image sensor" may be per each pixel position along a pixel line of the image sensor, such as exemplified above in connection with FIGS. 3A-3E, where the pixel windows are moved along pixel lines corresponding to pixel columns y of the image sensor. In general, the pixel line may be in a predefined or predetermined direction, e.g. corresponding to a pixel row or column of the image sensor, or corresponding to any other direction in the sensor area of the image sensor. The predefined direction may be user configurable. The image sensor circuitry may perform the actions for multiple parallel pixel lines of the image sensor.

The pixel position referred to under the following actions 501-505 thus corresponds to a position x,y of the sensor, i.e. where a pixel $p_{x,y}$ is located, and said actions are performed for all positions x,y within said at least subregion of the image sensor.

Action 501

The image sensor circuitry assigns to said pixel position x,y a predefined, e.g. predetermined, pixel window, w, e.g. corresponding to pixel window 350. The pixel window w comprising said pixel position x,y and one or more of its closest neighboring pixel positions. In the context of the example discussed above in connection with FIGS. 3A-F, the pixel window is thus assigned the pixel position x,y so that the target pixel position, e.g. 351, is at position x,y.

Preferably the predefined pixel window w is one dimensional. That is, the predefined window involve only subsequent pixels along a line of pixels. This typically facilitates implementation, and compatibility with many common and existing image sensors where all pixels in a line, e.g. column, often are connected to and are read using a common bus. The predefined pixel window w may e.g. consist of the pixel position x,y and one or two closest neighboring pixels directly before and/or directly after the pixel position x,y.

Examples of different pixel windows that may be used with embodiment herein are described separately below.

Action 502

The image sensor circuitry obtains first pixel values, e.g. v1 as exemplified above, from each pixel, e.g. $p_w$, located within said predefined pixel window w. The first pixel values resulting from the same exposure and corresponding to sensed light from this exposure, or in other words, sensed by said pixels of the image sensor that are within the pixel window. This action may thus comprise reading pixel values from the involved pixels of the image sensor.

Action 503

The image sensor circuitry combines the obtained first pixel values, e.g. v1, into a single, second pixel value, e.g. v2, according to a predefined, e.g. predetermined, combination function. The second pixel value being assigned said pixel position x,y. This may be seen as the second value v2 is being assigned to or is being associated with pixel position x, y instead of the first pixel value v1, i.e. instead of the value as sensed by the image sensor at this pixel.

Action 504

The image sensor circuitry may thus provide the second pixel value, e.g. v2, as the pixel value of the pixel position x,y instead of its first pixel value, e.g. v1. That is, the second pixel value is provided as the pixel values of the pixel position instead of the first pixel value as conventionally would be the case. The resolution is thus maintained.

When the above Actions 501-504 are performed for all involved pixel positions, e.g. of said at least subregion of the image sensor, the combining of the first pixel values, e.g. v1, into the second pixel value, e.g. v2, may be made in parallel for pixel positions with non-overlapping pixel windows and sequentially for pixel positions with overlapping pixel windows. Since each first pixel value thereby is not be involved in multiple combinations into second pixel values at the same time, implementation with image sensors based on destructive readout is facilitated. The principle may be better understood in view of examples that follow below. By parallel is here meant that the combining into second pixel values are made fully or partly overlapping in time. Overlapping window here means windows that share one or more pixel positions. If each window e.g. consist of 3 pixel positions, such as a 1×3 window, e.g. the pixel window 350, and a second pixel value shall be provided for each pixel position and thus for all three pixels covered by such window, this will involve three overlapping windows and thereby the combining into the three second pixel values for these 3 pixel positions should be sequential.

Moreover, as already indicated above, first pixel values, e.g. v1, obtained for pixel positions with overlapping windows may be from different exposures of the image sensor. The different exposures enable or facilitate implementation with image sensors based on destructive readout. There will typically be as many different exposures as pixels positions of the predefined window.

Action 505

The image sensor circuitry may then provide the digital image based on the second pixel values.

Actions 501-503, when performed per each pixel position, enable reduced influence of laser speckles in a digital image based on the second pixel values instead on the first pixel values. At the same time, since there will still will be a 1:1 mapping between second and first pixel values, loss of resolution can be avoided, which would result if conventional binning of pixel values was applied. Also, the combination, typically including adding of first pixel values, enables increased signal, which can be utilized to decrease exposure time and save time per exposure to produce first pixel values. This can be utilized so that a digital image with said reduced influence of speckles and based on second pixel values can be provided at approximately the same speed as a conventional digital image comprising first pixel values.

As already indicated above, the combination function may be based on adding the first pixel values, e.g. v1, of pixel positions, e.g. $p_w$, located within the predefined pixel window. Further, the combination function may be based on averaging the first pixel values, e.g. v1, of pixel positions, e.g. $p_w$, located within the predefined pixel window, e.g. w.

That is, the second pixel value for a pixel position may simply be accomplished by averaging the first pixel values of pixels within the pixel window w, and this may comprise or even consist of just adding the first pixel values.

In some embodiment, the combination function is based on weighting one or more of the first pixel values, e.g. v1, of pixels, e.g. $p_w$, located within the predefined pixel window. A pixel with weighted first pixel value may be the one at the target pixel position of the pixel window. Reason for such weighting may be that it can be desirable with more impact from the first pixel value that will be "replaced" by the second pixel value. This may enable an improved digital image. In other words, the combination function may be such that the combination in Action 503 weights the first pixel value of the pixel position x,y more than any other of the first pixel values, e.g. v1, of pixels, e.g. $p_w$ located within the predefined pixel window.

To facilitate speed and/or reduce memory needs, it may be preferred to implement embodiments herein fully or partly in hardware instead of only in software, and close to the actual pixels and sensed pixel values. The first pixel values, e.g. v1, and second pixel values, e.g. v2, are preferably analogue pixel values. In other words, the actions are preferably performed and the image sensor is preferably configured to operate according to the above actions before analogue-to-digital conversion is taking part. Examples of how this can accomplished in practice will be separately discussed below.

This enable efficient implementation facilitate operation at high speed. Operating on analogue pixel values may also enable less noise in a resulting digital image compared to if the combination is done based on digital values.

In a practical implementation of the above, the predefined window and/or the predefined combination function may be user configurable, such as user selectable. For example, it may be configurable for a user via software and/or hardware, to apply or not apply such predefined, e.g. predetermined pixel window(s) and/or combination function(s) as disclosed herein. If no pixel window or combination function is applied, e.g. configured or selected to not be applied, operation may be as conventionally and first pixel values, e.g. v1, may be provided as conventionally instead of the second pixel values, e.g. v2.

Figure 6A:
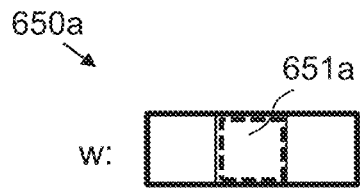
FIGS. 6A-6E schematically show and exemplify different pixel windows that may be used with embodiments herein.
Figure 6B:
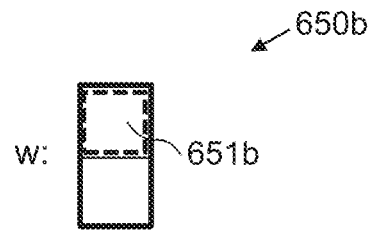
Figure 6C:
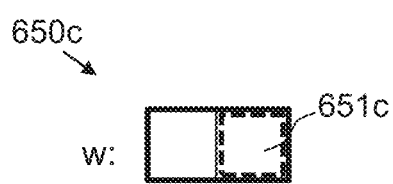
Figure 6D:
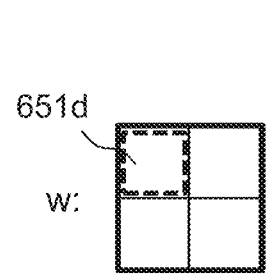
Figure 6E:
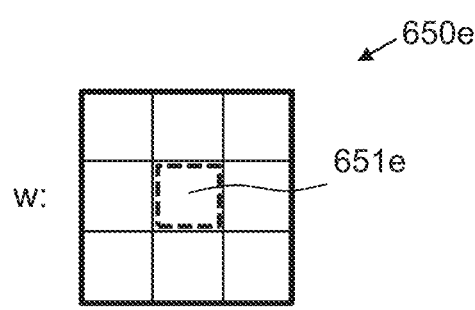

FIGS. 6A-6E schematically show and exemplify different pixel windows w that may be used with embodiments herein. FIG. 6A shows a pixel window 650a with target pixel position 651a, consisting of three subsequent pixels along a line just as the pixel window 350 but here oriented in a perpendicular direction and for movement in a perpendicular direction compared to how the pixel window 350 was moved in the above example. FIGS. 6B-C show two orientations of two-pixel pixel windows, a pixel window 650b with a target pixel position 651b and a pixel window 650c with target pixel position 651c. Two pixels are the minimum window size possible. The pixel windows in FIGS. 6A-C are examples of one dimensional pixel windows, i.e. with pixels that are oriented in only one direction, i.e. along a line, which may be preferred from an implementation point of view and may be sufficient for desirable speckle reduction in many applications. FIG. 6D shows example of a four pixels two dimensional pixel window 650d with a target pixel position 650d, and FIG. 6E shows example of a 9 pixels pixel window 650e with target pixel position 651e.

Figure 7:
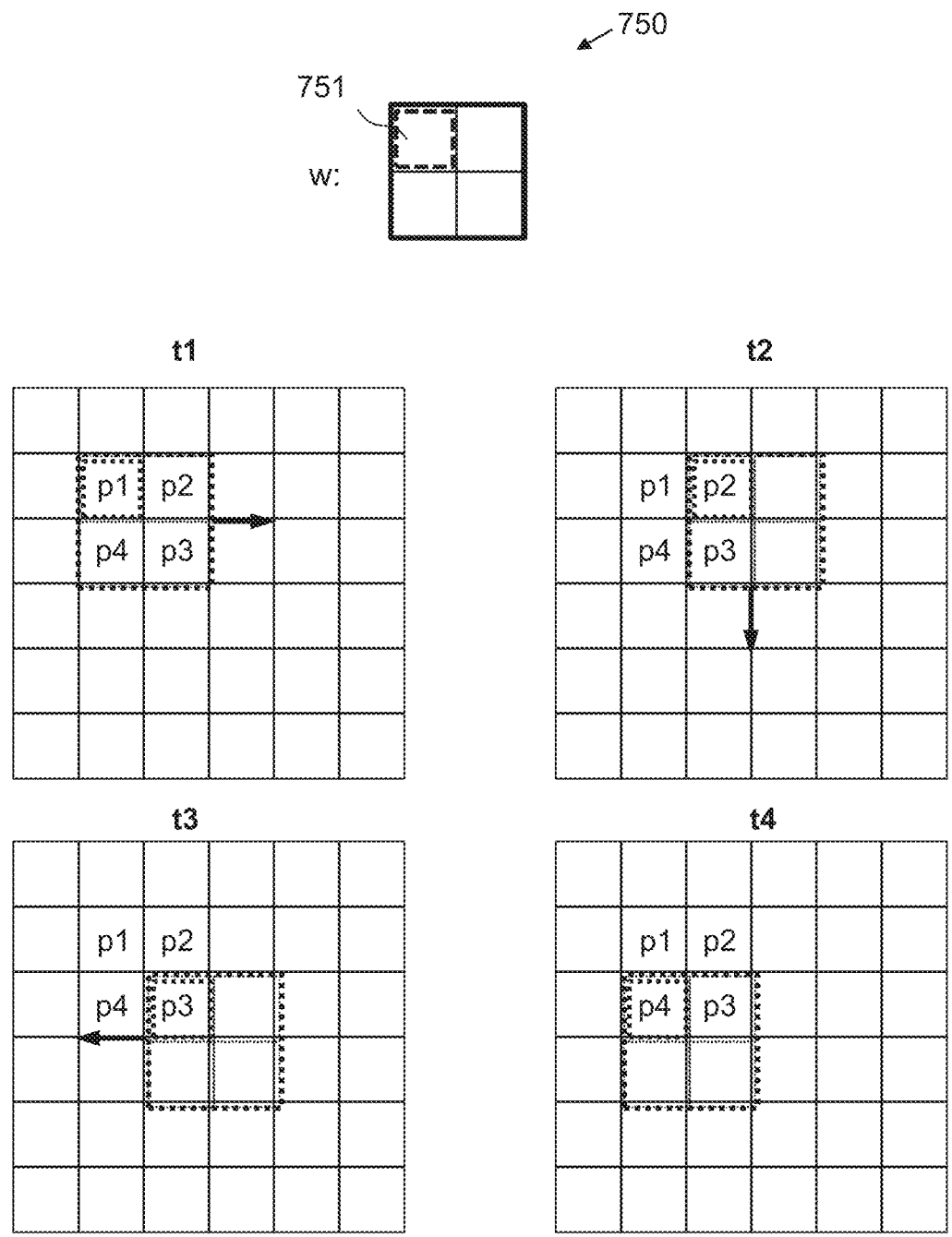
FIG. 7 schematically illustrates how a four pixel window may be positioned at four different time instants to avoid overlapping pixel windows at the same time.

FIG. 7 schematically illustrates how a four pixel window 750 with target pixel position 751 may be positioned at four different time instants t1-t4, to avoid simultaneous overlapping of pixel windows and multiple use of the same first pixel value in different combinations to form second pixel values. At each time instant the pixel window is positioned with its target pixel position at a different pixel: At t1 at the pixel p1. At t2 at the pixel p2. At t3 at the pixel p3. At t4 at the pixel p4. An arrow at each time instant indicates how the pixel window is to be moved next. At each time instant and window position, actions corresponding to Actions 501-504 may be performed for the pixel at the target pixel position. Before t1 the image sensor is thus exposed to light, light is sensed and the pixels thereafter holds first pixel values resulting from the sensed light. At t1, at least the first pixel values of pixels within the pixel window are being read, at t1 these are pixels p1-p4, and the first pixel values are combined according to the predefined combination function, e.g. averaged, and the result is second pixel values that is assigned pixel p1 since that pixel is at the target pixel position of the pixel window.

It should be understood that although only a single pixel window is shown at each time instant in the figure, there may in practice be multiple further non-overlapping pixel windows applied at the same time. To the extent possible depending on e.g. implementation, actions corresponding to Actions 501-504 may also be performed at the same time for pixels at target pixel positions of said further non-overlapping pixel windows. When the shown pixel window is moved as indicated by the arrows in the figure, the further windows are preferably moved in a corresponding manner, i.e. in the same pattern as shown in the figure. This way, after the four time instants, there can be second pixel values for all pixels shown. For similar reason as explained above there may be ¼ of a nominal or normal exposure time applied for exposing the pixels between the time instants, i.e. ¼ of the exposure time that would conventionally be used, or in other words, ¼ of the exposure time that would be used in case of a single exposure and readout of first pixel values without combination into second pixel values for forming the digital image.

Figure 8A:
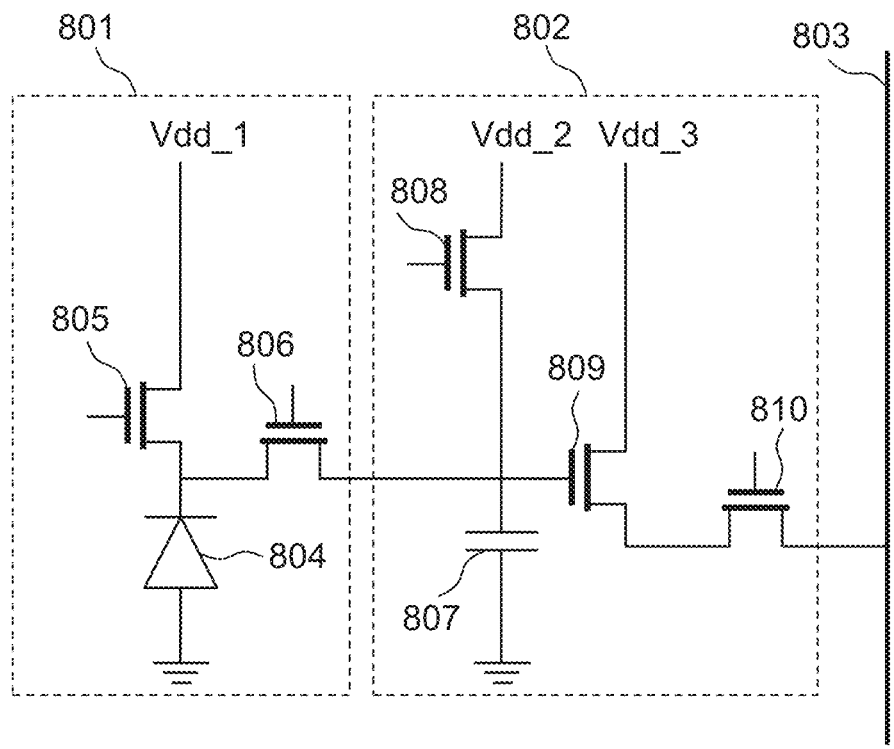
FIGS. 8A-B schematically illustrate how an conventional image sensor pixel may be designed and the principle how such pixels may be arranged to form the image sensor.
Figure 8B:
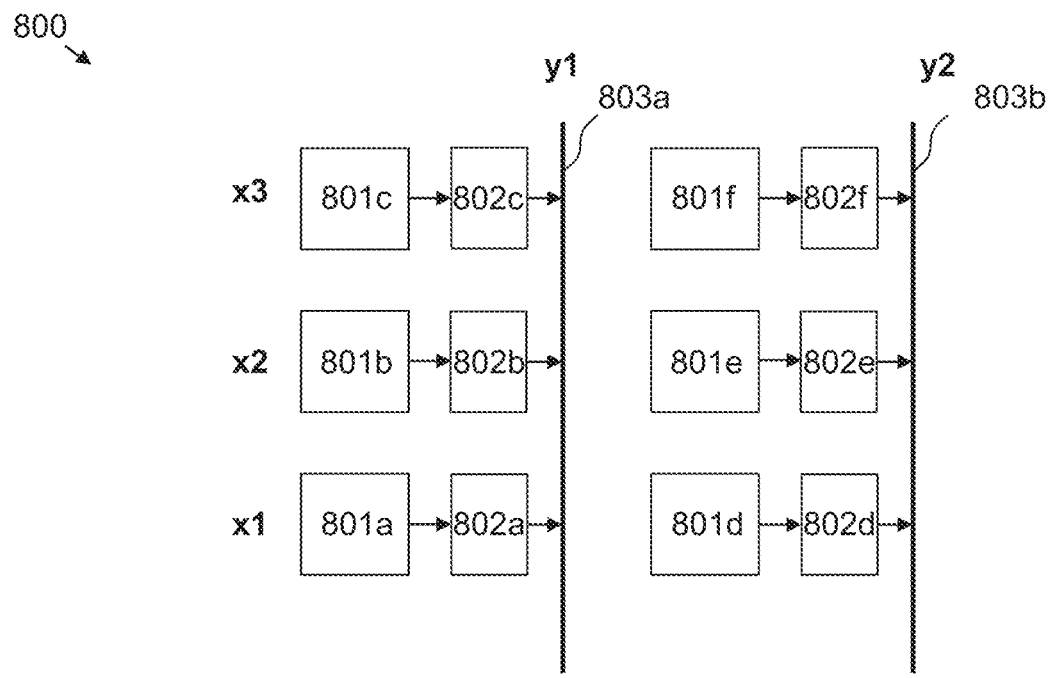

FIGS. 8A-B schematically illustrates how an conventional image sensor pixel may be designed and the principle how such pixels may be arranged to form the image sensor.

Each pixel comprises a light sensing part 801 connected to a readout part 802 that in turn is connected to a bus line 803. It is shown part of three pixel rows x1-x3 and part of two pixel columns y1-y2 with respective bus lines 803*a* and 803*b*, i.e. in total is shown 6 pixels. A pixel x1,y1, i.e. at a pixel position at row x1 in column y1, comprises a light sensing part 801*a* and a readout part 802*a* that connects to the bus line 803*a*. As realized from the figure the other shown pixels comprise corresponding parts. Pixels in the same column y are here connected to the same bus line that in turn is connected to further circuitry (not shown), e.g. including circuitry for analogue to digital conversion and may also comprise some memory and circuitry for performing further, e.g. arithmetic, operations on read image data. The read data conventionally corresponds to first pixel values discussed above. The image sensor is typically operated so that lines, e.g. exemplified by x1-x3 in the figure, are read sequentially and only one pixel per column is providing signal to the bus line at the same time. Pixels of columns in the same row can be and are typically read in parallel.

As can be seen in FIG. 8A each pixel comprise a number of transistors, typically Complementary Metal Oxide Semiconductor (CMOS) transistors, operating as, and referred to as, switches in the following. The light sensing part 801 comprises a light sensing component, here illustrated by a light sensitive photo diode 804, that accumulates charge when exposed to light, a first reset switch 805 that is used for reset of the photo diode 803 and a readout switch 806 that is opened to transfer charge after exposure from the photo diode 804 to the readout part 802. The readout part 802 comprises a capacitor 807 that stores the charge transferred from the light sensing part 802, a second reset switch 808 for resetting the readout part 802, a readout transistor 809 and a bus switch 810. The readout transistor 809 converts the charge at the capacitor 807 to a voltage proportional to the charge when the bus switch 810 is opened and the bus line thereby is set to the voltage.

Figure 9:
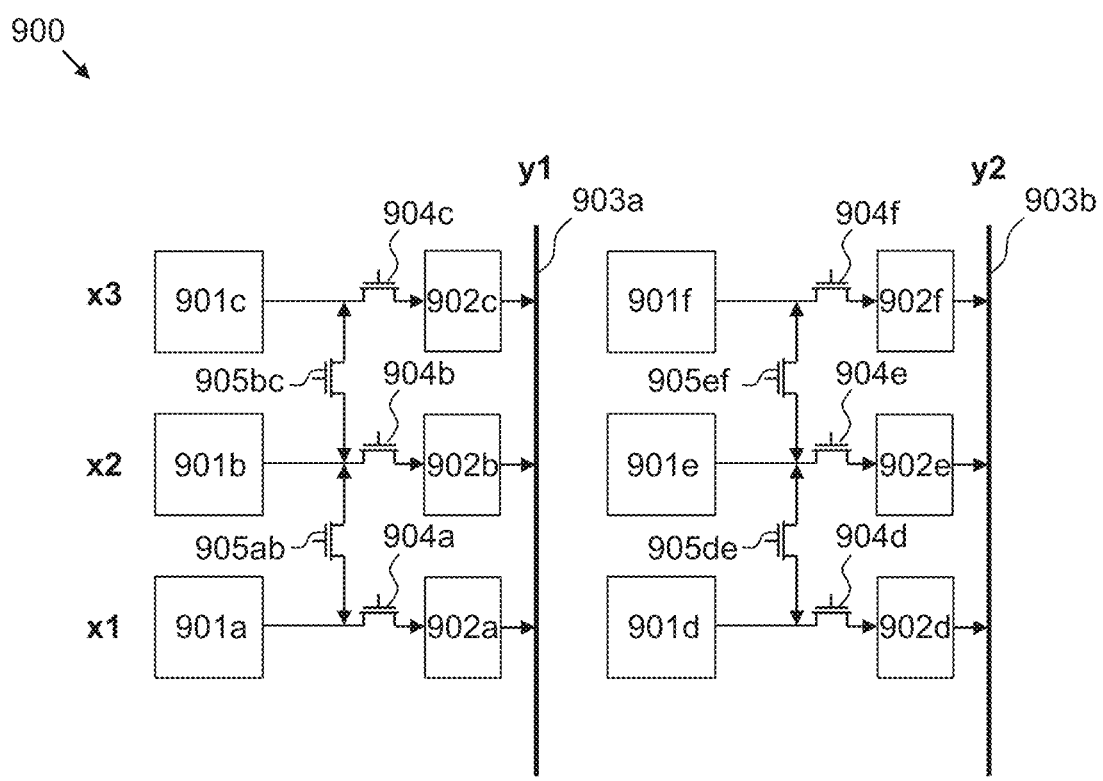
FIG. 9 schematically illustrates how embodiments herein may be implemented by modification of such conventional mage sensing circuitry as described in connection with FIGS. 8A-B.

FIG. 9 schematically illustrates how embodiments herein may be implemented by modification of such conventional mage sensing circuitry as described above in connection with FIGS. 8A-B. As recognized from the figure there are per pixel of the image sensor a light sensing part 901 and readout part 902 that may be as the light sensing part 801 and readout part 802 in FIG. 8A. However, some additional switches have been added to introduce the possibility to selectively interconnect outputs of light sensing parts of directly neighboring pixels and thereby enable to operate the image sensor to carry out actions according to embodiments herein and as described above in connection with FIG. 5. Each readout part has been added an input switch at its input, e.g. readout part 902*b* has a input switch 904*b*. Further, in the example, each pixel in a column y has the output of its light sensing part interconnected with output(s) of the light sensing part(s) of its directly neighboring pixel(s) in the same column. Each interconnection is made via an interconnection switch. For example, pixel x2, y1 has the output of its light sensing part 901*b* interconnected, via an interconnect switch 905*ab*, with the output of the light sensing part 901*a* of the neighboring pixel x1, y1, and, via an interconnect switch 905*bc*, with the output of the light sensing part 901*c* of the neighboring pixel x3, y1. To form a second pixel value as above for pixel x2, y1, e.g. corresponding to pixel p3,1 and using a 3×1 pixel window such as the pixel window 350, the image sensor is exposed with light that is sensed by e.g. the light sensing parts 901*a-c*. Thus, the respective photo diode of the light sensing parts thereafter holds charge resulting from the sensing. The interconnect switches 905*ab* and 905*bc* are closed and thus the outputs of the light sensing parts 901*a-c* are interconnected. The input switches 904*a*, 904*c* are opened and thus disconnects the readout parts 902*a* and 902*c* so they cannot receive input, while the input switch 904*b* is closed. When the readout switches of the light sensing prats 901*a-c*, where each such readout switch may correspond to the readout switch 806, are closed, the sensed charges adds up from all outputs of the light sensing parts 901*a-c* and are transferred to the capacitor of the readout part 902*b*, i.e. a capacitor corresponding to the capacitor 807, forming the second pixel value and resulting in a corresponding voltage on the bus line 903*a* via the readout part 902*b*.

By controlling interconnect switches and input switches this way, it is realized that various pixel windows can be accomplished with averaging of first pixel values from pixels within these pixel windows, and the second pixel value be assigned a selectable certain pixel within the pixel window. It can e.g. be accomplished 2×1 sized pixel windows. With further interconnect switches and connections between columns also two dimensional pixel windows can be accomplished. Basically any kind of pixel window, such as any one of the ones exemplified above, can be accomplished based on the same principle.

Hence, as realized from the above, the predefined pixel window, e.g. w, and the combination function, such as described above in connection with FIG. 5, may be implemented based on selective interconnections between pixels of the image sensor so that sensed charges of pixels, e.g. $p_w$, located within the predefined pixel window are combined into the second pixel value. The second pixel value may then, i.e. subsequently, be converted to a voltage for readout and e.g. provided to a bus line, e.g. bus line 903*a* or 903*b*, used for reading image data from the image sensor.

Other hardware based implementation of embodiments herein may instead include introduction and/or use of analogue memories, e.g. connected to the bus lines and for temporarily storing readout voltages corresponding to first pixel values, so that the same read voltage can be used in multiple combinations, e.g. added multiple times, even if read sequentially, and form voltages corresponding to the second pixel values for all involved pixels. Any further operations including analogue to digital conversion may be performed on second pixel values instead of first pixel values. In some alternative embodiments, analogue to digital conversion is performed on first pixel values and results in digital first pixel values that then may be combined as above, e.g. after first being stored in memory, into digital second pixel values. The image sensing circuitry may thereafter provide a digital image based on this, i.e. based on the digital second pixel values.

Figure 10:
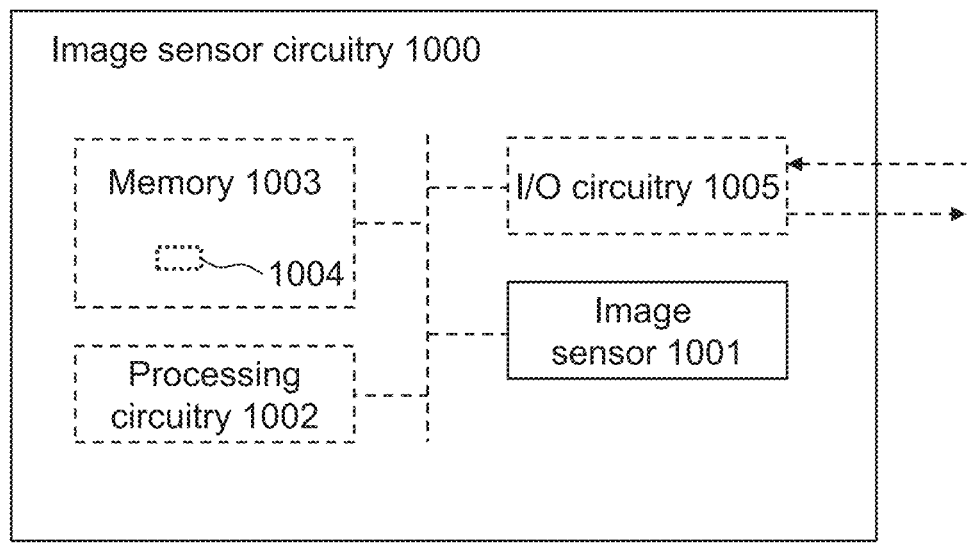
FIG. 10 is a functional block diagram for illustrating embodiments of an image sensor circuitry according to embodiments herein and how such device can be configured to carry out the method and actions described in relation to FIG. 5.

FIG. 10 is a schematic block diagram for illustrating embodiments of an image sensor circuitry 1000, that may be such image sensor circuitry discussed above and for performing the method and/or actions as discussed above. The schematic block diagram is also for illustrating embodiments of how the image sensor circuitry 1000 may be configured to perform the method and actions discussed above in relation to FIG. 5.

Hence, the image sensor circuitry 1000 may be for supporting provision of a digital image based on second pixel values as discussed above, instead of first pixel values, and thereby enable reduced influence of laser speckles in the digital image.

The image sensor circuitry 1000 comprises an image sensor 1001. The image sensor as such may be of a conventional type, e.g. a CMOS array or Charge Coupled Device (CCD) array type of image sensor.

The image sensor circuitry 1000 may also comprise processing circuitry 1002 involved in processing and e.g. encoding of signals and data, as exemplifying hardware module(s) and/or circuit(s), and may comprise or correspond to one or more processors or processing circuits. The processing circuitry may e.g. comprise part of circuitry, such as shown in FIG. 9, that is not part of what would be considered the image sensor as such. Also any circuitry for analogue to digital conversion may be part of the processing circuitry 1002.

The image sensor circuitry 1000 may further comprise memory 1003 that may comprise, such as contain or store, a computer program 1003. The computer program 1003 comprises 'instructions' or 'code' directly or indirectly executable by the image sensor circuitry 1000 to perform at least part of said method and/or actions. The memory 1002 may comprise one or more memory units and may further be arranged to store data, such as configurations, data and/or values, involved in or for performing functions and actions of embodiments herein. In some embodiments, the memory 1002 may comprise the computer program 1003 executable by the processing circuitry 1002, whereby the image sensor circuitry 1000 is operative, or configured, to perform said method and/or actions thereof.

The image sensor circuitry 1000, e.g. the processing module(s) 1001, may comprise an Input/Output (I/O) circuitry 1005, configured to be involved in, e.g. by performing, any communication to and/or from other units and/or devices, such as sending and/or receiving information to and/or from devices external to the image sensor circuitry 1000, e.g. external to a chip implementing the image sensor circuitry 1000. The I/O circuitry(s) 1005 may be exemplified by obtaining, e.g. receiving, module(s) and/or providing, e.g. sending, module(s), when applicable.

Further, in some embodiments, the image sensor circuitry 1000, e.g. the processing circuitry 1002 comprises one or more of assigning module(s), obtaining module(s), combining modules(s) and providing module(s), as exemplifying hardware and/or software module(s) for carrying out actions of embodiments herein. These modules may be fully or partly implemented by the processing circuitry 1002.

Hence:

The image sensor circuitry 1000, and/or the processing circuitry 1002, and/or the assigning module(s) may be operative, or configured, to, per each pixel position of at least said subregion of the image sensor, assign to the pixel position, e.g. x,y, the predefined pixel window, e.g. w, as as described above in connection with FIG. 5.

The image sensor circuitry 1000, and/or the processing circuitry 1002, and/or the I/O circuitry(s) 1005, and/or the obtaining module(s) may be operative, or configured, to, per each pixel position of at least said subregion of the image sensor, obtain said first pixel values, e.g. v1, for each pixel, e.g. $p_w$, located within said predefined pixel window, e.g. w, as described above in connection with FIG. 5.

The image sensor circuitry 1000, and/or the processing circuitry 1002, and/or the and/or the obtaining module(s) may be operative, or configured, to, per each pixel position of at least said subregion of the image sensor, combine the obtained first pixel values, e.g. v1, into said single, second pixel value, e.g. v2, according to said predefined combination function, as described above in connection with FIG. 5.

Moreover, the image sensor circuitry 1000, and/or the processing circuitry 1002, and/or the I/O circuitry(s) 1005, and/or the providing module(s) may be operative, or configured, to, per each pixel position of at least said subregion of the image sensor, provide the second pixel value, e.g. v2, as the pixel value of the pixel position, e.g. x,y, instead of its first pixel value, e.g. v1, as described above in connection with FIG. 5.

Further, the image sensor circuitry 1000, and/or the processing circuitry 1002, and/or the I/O circuitry(s) 1005, and/or the providing module(s) may be operative, or configured, to provide said digital image based on second pixel values, as described above in connection with FIG. 5, i.e. the digital image is provided when there has been provided second pixel values, e.g. v2, for the pixel positions, e.g. x, y, of said at least subregion of the image sensor.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first value, second value, first device, second device etc., should as such be considered non-limiting and the terminology as such does not imply a certain hierarchical relation. Without any explicit information in the contrary, naming by enumeration should be considered merely a way of accomplishing different names.

As used herein, the terms "number" or "value" may in general refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "configured to" may mean that a processing circuit is configured to, or adapted to, by means of software or hardware configuration, perform one or more of the actions described herein.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by an image sensor circuitry comprising an image sensor, for reduction of laser speckle effects in a digital image resulting from the image sensor sensing laser light reflected from an object as part of laser triangulation performed by a 3D imaging system, wherein the method comprises:
per each pixel position (x, y) of at least a subregion of the image sensor:
assigning to said pixel position (x,y) a pixel window (w) comprising said pixel position (x,y) and one or more of its closest neighboring pixel positions,
obtaining first pixel values for each pixel located within said pixel window (w), said first pixel values resulting from the same exposure and corresponding to sensed light from this exposure, and
combining the obtained first pixel values into a single, second pixel value according to a combination function;
wherein the first pixel values and the second pixel values of said pixel positions of said at least subregion of the image sensor are analogue pixel values and said pixel windows (w) assigned to said pixel positions of said at least subregion of the image sensor are one dimensional and oriented in the same direction; and
providing the digital image based on the second pixel values, whereby there is reduction of laser speckle effects in the digital image compared to if the digital image would be based on the first pixel values;
wherein the combining of the first pixel values (v1) into the second pixel value (v2) is made in parallel for pixel positions with non-overlapping pixel windows (w) and sequentially for pixel positions with overlapping pixel windows (w).

2. The method as claimed in claim 1, wherein per each pixel position (x, y) of
at least a subregion of the image sensor is per pixel position along a pixel line (y) of the image sensor.

3. The method as claimed in claim 1, wherein the pixel window (w) consists of the pixel position (x,y) and one or two closest neighboring pixels directly before and/or directly after the pixel position (x,y).

4. The method as claimed in claim 1, wherein the combination function is based on adding the first pixel values (v1) of pixels ($p_w$) located within the pixel window (w).

5. The method as claimed in claim 1, wherein the combination function is based on averaging the first pixel values (v1) of pixels ($p_w$) located within the pixel window (w).

6. The method as claimed in claim 5, wherein the combination function is
based on weighting one or more of the first pixel values (v1) of pixels ($p_w$) located within the pixel window (w) before the averaging.

7. The method as claimed in claim 6, wherein the combination function weights the first pixel value (v1) of the pixel at said pixel position (x,y) more than any other of the first pixel values (v1) of pixels ($p_w$) located within the pixel window (w).

8. The method as claimed in claim 1, wherein there is overlap between pixel windows assigned to closest neighboring pixels and wherein first pixel values (v1) obtained for pixel positions with overlapping windows are from different exposures of the image sensor.

9. The method as claimed in claim 1, wherein the pixel window (w) and combination function are implemented based on selective interconnections between pixels of the image sensor so that sensed charges of pixels (pw) located within the pixel window (w) are combined into the second pixel value.

* * * * *